United States Patent

[11] 3,598,428

[72] Inventors John J. Smith;
Lawrence F. Luckenbill; Peter N. Cassimatis, all of Decatur, Ill.
[21] Appl. No. 3,841
[22] Filed Jan. 19, 1970
[23] Continuation-in-part of Ser. No. 796,506, Feb. 4, 1969, which is a continuation-in-part of Ser. No. 708,314, Feb. 26, 1968, abandoned.
[45] Patented Aug. 10, 1971
[73] Assignee Mueller Co.
Decatur, Ill.

[54] PIPE COUPLING
25 Claims, 8 Drawing Figs.
[52] U.S. Cl. .................................................. 285/3, 285/174, 285/334.5, 285/341
[51] Int. Cl. .................................................. F16l 35/00
[50] Field of Search .................................................. 285/2, 3, 4, 174, 334.5, 341; 137/67, 797; 138/89; 9/323, 324, 325; 222/5, 54, 81, 83, 541; 220/27

[56] References Cited
UNITED STATES PATENTS
2,507,379  5/1950  Morrison ..................... 138/89 X
2,933,333  4/1960  Bredtschneider et al. ..... 285/3
3,339,812  9/1967  Meissner ..................... 222/83 X
3,391,951  7/1967  Miller ......................... 285/3
3,399,806  9/1968  Lucas ......................... 137/67 X Primary Examiner—Dave W. Arola
Attorney—Cushman, Darby & Cushman ABSTRACT: A pipe coupling for connecting an end of a pipe into a water distribution system while there is pressure on the system. The pipe may have either a flared end or a flareless end. The pipe coupling is provided with a temporary sealing means which allows initial connection of the pipe into the system so that delivery of water may be provided at a later time upon complete makeup of the coupling or after the elapse of a predetermined amount of time necessary to dissolve the temporary sealing means when the same is water soluble. If immediate delivery of water from the water distribution system to the pipe is desired, the coupling may be completely made up immediately so that the cutter means carried within the coupling is actuated to cause removal of the temporary sealing means.

PATENTED AUG 10 1971

INVENTOR.
JOHN J. SMITH, LAWRENCE F.
LUCKENBILL, PETER N. CASSIMATIS
BY
Cushman, Darby and Cushman

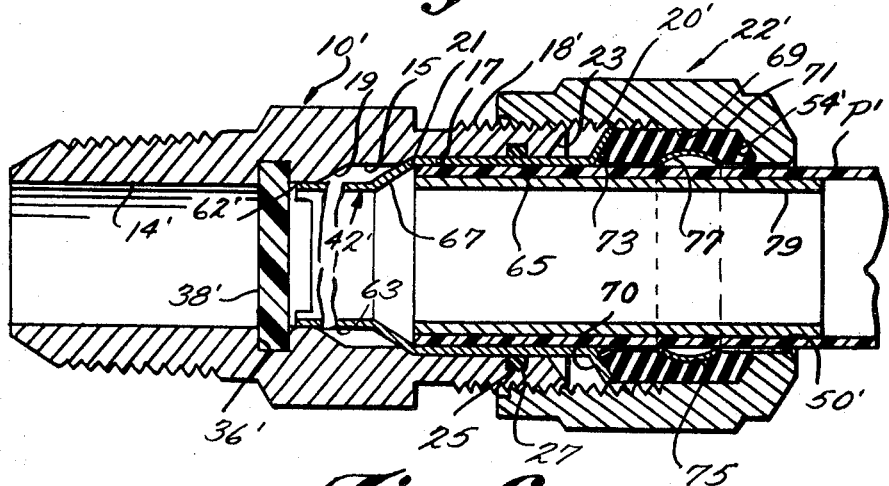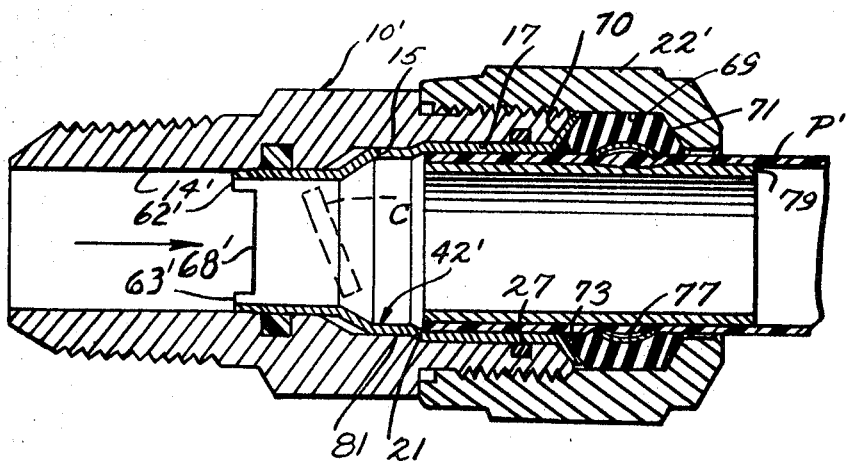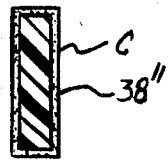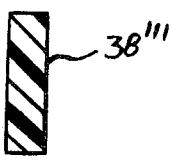

PIPE COUPLING

This application is a continuation-in-part of our copending U.S. application Ser. No. 796,506 filed Feb. 4, 1969, the said application Ser. No. 796,506 being a continuation-in-part application of our U.S. application Ser. No. 708,314, filed Feb. 26, 1968 and now abandoned.

The present invention relates to a pipe coupling for connecting an end of a pipe into a water distribution system while there is pressure on the system and, more particularly, a coupling adapted to effect communication with the water distribution system after the coupling members are preliminarily connnected together in sealing relationship and after a temporary sealing means provided in the coupling has been removed from blocking flow through the coupling. The coupling of the present invention contemplates providing delivery of water from the water distribution system to a pipe either immediately upon complete coupling makeup or after a predetermined time.

SUMMARY OF THE INVENTION

Briefly, the coupling of the present invention includes a first coupling member having a disk therein, the first coupling member being adapted to be inserted into a pressurized water main with the disk temporarily blocking flow from the main; a second coupling member for receiving the end of the pipe to be connected to the main, the second coupling member being connected to the first coupling member after insertion of the first coupling member into the pressurized main. Further, the coupling of the present invention includes a cutter member positioned between the first coupling member and the second coupling member, the cutting member being axially advanced in the coupling members when the first coupling member and the second coupling member are tightened, thus causing the cutter member to cut, crack, or fracture at least a part from the disk if immediate delivery of water to the pipe is desired. One aspect of the invention contemplates using the above described coupling with a flared pipe, whereas another aspect of the invention contemplates using the described coupling with a flareless pipe.

An important object of the present invention is to provide a coupling arrangement for pressurized systems which may be utilized in two ways; first, to provide a temporary seal during and until after connection of a pipe to a main has been accomplished and, second, to provide for immediate service for a pipe if so desired after connection has been made.

Another object of the present invention is to provide an improved coupling construction in which there is a minimum pressure drop through the coupling once the coupling had been placed into service.

Still another object of the present invention is to provide a coupling arrangement having a temporary seal therein, the temporary seal being completely removed or eliminated from the system when the seal has been opened. One aspect of this invention contemplates utilizing a water soluble disk provided with a nonsoluble coating, rather than a nonsoluble diaphragm member or disk in which a portion remains in the coupling, as there is no opportunity for the temporary seal, once opened, to restrict the flow of water through the system.

Another aspect of the invention contemplates utilizing a nonsoluble disk made from a brittle frangible material which may be cracked out of the coupling at the wall of the bore therein in small pieces and flushed downstream and out of the pipe before connection to a building.

A still further object of the present invention is to provide a coupling arrangement with a temporary seal therein and cutter means therein to open said seal if immediate service is desired, the actuation of the cutter means only requiring applying further torque of the members of the coupling, thus eliminating possible damage to the coupling which might cause thread leakage.

A further object of the present invention is to provide a coupling arrangement with a cutter therein, a temporary seal therein made of a water soluble disk which will provide a time lag before dissolving or made from a nonsoluble disk, thus providing service personnel with sufficient time to completely set a service line before flow starts in the service line or is initiated by completing the makeup of the coupling.

Ancillary to the preceding object, it is a further object of the present invention to provide a coupling arrangement with a temporary seal which permits the service line downstream of the same to be completely assembled and back pressure tested, and once tested, the coupling arrangement, which is also provided with cutter means, is completed by advancing the cutter means so that the cutter means fractures the seal, thus, immediately actuating service to the assembled service line. When the disk is made of a nonsoluble material or is made from a water soluble material provided with a nonsoluble coating, the initiation of service may be delayed indefinitely but easily activated when necessary.

These and other objects and advantages of the present invention will appear more fully in the following specification, claims and drawings in which:

BRIEF DESCRIPTION OF THE DRAWINGS

FIG. 5 is a cross-sectional view of a modified arrangement of the coupling of the present invention for flareless pipe, the view illustrating temporary blockage of the flow of water and the preloading of the gasket seal to form a watertight joint;

FIG. 6 is a cross-sectional view of the coupling arrangement of FIG. 5 illustrating the advancement of the cutter member to a position where the temporary seal is cut or fractured and service is completed;

FIG. 7 is a cross-sectional view illustrating a modified form of a temporary sealing disk made of a water soluble material and having a nonsoluble coating such as wax, plastic or the like; and FIG. 8 is a cross-sectional view illustrating a further modified form of temporary sealing disk made of a nonsoluble brittle frangible material, such as a plastic, resin, ceramic or the like.

DETAILED DESCRIPTION OF THE INVENTION

Figure 1:
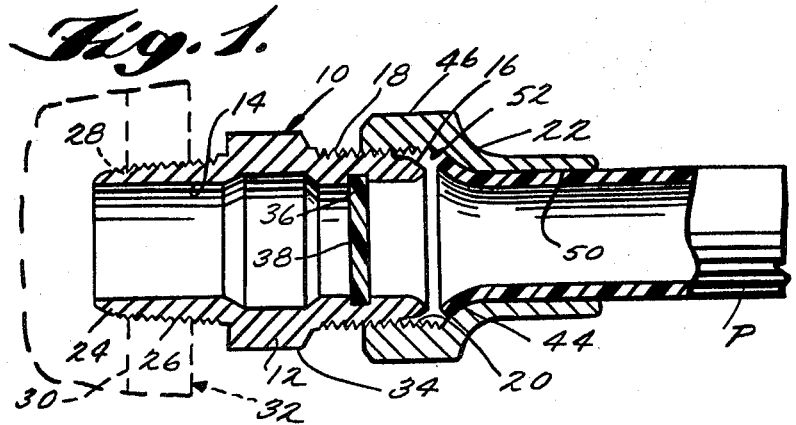
FIG. 1 is a cross-sectional view of the coupling of the present invention illustrating the coupling members being assembled into a position to provide temporary blockage of the flow of water to the service pipe.

REferring now to the drawings wherein like reference numerals or characters represent like or similar parts, a first or male coupling member 10 includes a body 12 having an axial bore 14 therethrough. The coupling member 10 is provided at one end with a hose portion 16 having exterior threads 18 for receiving the interior threads 20 of a second or female coupling member or sleeve nut 22. The coupling member 10 is also provided with a second end portion 24 which is exteriorly threaded at 26, the end portion 24 being adapted to be received in a drilled and tapped hole 28 provided in a wall 30 of a water main generally designated at 32 and shown in broken lines. Of course, it is within the scope of the present invention that the end portion 24 of the coupling member 10 may be of a different configuration, depending upon the element to which a coupling member is to be attached. For example, the end portion 24 could be designed to receive the end of a pipe, the pipe being welded to the coupling member 10. The center portion 34 of the coupling member 10 is preferably hexagonal shaped in order that it may receive a wrench or the like.

As clearly shown in FIG. 1, the wall of the axial bore 14 is provided with an annular groove 36 spaced apart the end of the nose portion 16. A disk 38 is molded into place with its periphery supported in the annular groove 36, the disk providing a temporary blocking means for the axial bore 14. By retaining the entire periphery of the disk 38 in the groove 36, the service line or pipe P downstream of the coupling may be back tested by applying pressure against the disk after the members 10 and 22 have been tightened.

The sealing disk 38 may be water soluble and made from "Carbopol 934," a carboxy vinyl polymer resin of extremely high molecular weight manufactured by B. F. Goodrich. The "Carbopol 934" is a general use bulking agent that can be solidified and will dissolve in water, the same also having nontoxic qualities. Another material which may be used as the water soluble disk 38 is "Radel," a polyethylene oxide resin produced by Union Carbide Corporation, the same also being nontoxic. Of course, a third material that could be used is a disk molded from gelatin or any other soluble material so long as the material, when dissolved, is not toxic.

The pipe P may be a plastic or copper pipe, the same having a flared end 44. The second coupling member 22, which may also be considered as a sleeve nut, is provided with an enlarged end portion 46, hexagonal in exterior shape for receiving a wrench, and a reduced end portion 48 having a bore 50 therethrough for axial alignment with the bore 14 of coupling member 10. The end portion 46 of coupling member 22 is interiorly threaded as indicated at 20, the threads 20 adapting to cooperate with the threads 18 of the first coupling member 10. An inturned annular shoulder 54 is provided between the inner end of the threads 18 and the bore 50, the shoulder 54 providing a seat for the exterior surface of the flared end 44 of pipe P. When the member 22 of FIG. 1 has been threaded up tight onto the member 10, the nose portion 16 will engage the inner surface of the flared end 44 of pipe P to form a seal therewith. The pipe P can be assembled downstream of the coupling and back tested if so desired. If immediate service is not required, the disk is left to dissolve on its own and, depending on the dimensions of the disk and the dissolvable material from which the disk is made, this will be a predetermined time lag. On the other hand, if immediate service is desired, the members 10 and 22 may be unthreaded and a cutter member 42 inserted therebetween. Upon rethreading the members 10 and 42, the cutter member advances toward and engages and fractures the disk 38 so that an opening is provided therein for flow of fluid therethrough.

Figure 2:
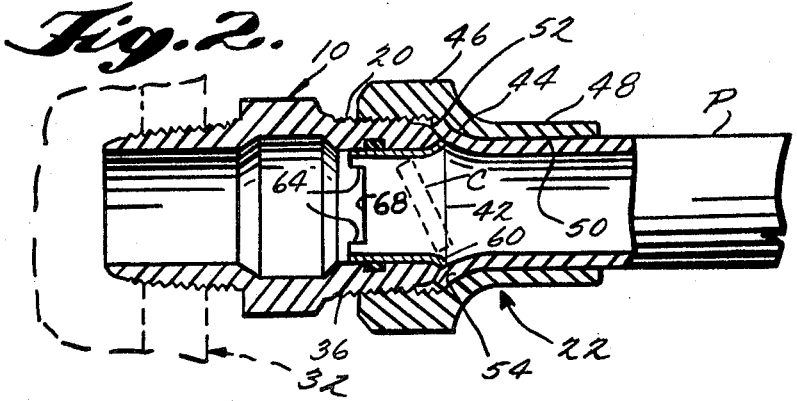
FIG. 2 is a cross-sectional view of the coupling of the present invention similar to FIG. 1 but illustrating the coupling members in an assembled position with a cutter member therebetween and wherein a coupon has been cut from the temporary sealing disk so that immediate delivery of water is supplied to the service pipe.
Figure 3:
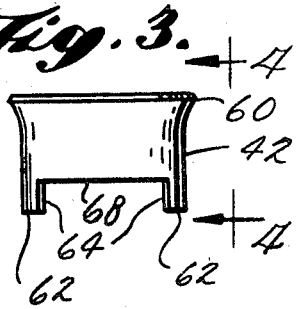
FIG. 3 is an enlarged side elevational view of the cutter member utilized in the coupling of FIGS. 1 and 2.
Figure 4:
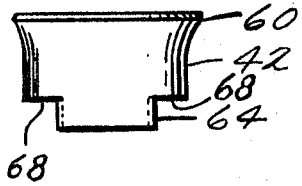
FIG. 4 is a further side elevational view of the cutter member of FIG. 3 taken substantially on the line 4—4 of FIG. 3.

As clearly shown in FIGS. 2, 3 and 4, cutter member 42 is positioned between the first coupling member 10 and the second coupling member 22, the cutter member 42 being tubular and having an exterior diameter no greater than the interior diameter of the bore 14, so that the cutter member may slide into the bore, The axial length of the cutter member 42 must be sufficient to fully penetrate the disk 38 when the members 10 and 22 have been tightened. The end of cutter member 42, which extends out of the bore 14, is outwardly flared, as indicated at 60, for abutting the interior surface of the flared end 44 of the pipe P as the coupling member 22 is threaded onto the coupling member 10. Once the cutter member 42 has its flared end engaging the flared end 44 of the pipe P, it will be advanced toward the water soluble disk 38 as the coupling members are threaded together. The cutter member 42 is provided on its end facing the water soluble disk 38 with a pair of oppositely disposed arcuate cutting portions or flat projections 62 separated by intermediate portions 68 for at least cracking an opening in a portion of the disk 38. Each cutting portion 62 may have sharp axially extending cutting edges 64 at their respective ends, for cutting into and fracturing the disk 38 so as to cut a complete coupon C therefrom. If a complete coupon is cut therefrom, it will be blown downstream by the water where it eventually dissolves.

In operation of the coupling of the present invention, it will now be appreciated that the coupling member or nipple 10 is first inserted into a drilled and threaded opening in the main 32. This may accomplished by a conventional tapping machine having means for inserting the coupling member after tapping and threading the hole. Since the coupling member 10 has the water soluble disk 38 preassembled therein by molding, and since the disk 38 is designed to dissolve after a predetermined time lag, there is ample opportunity to connect the pipe P to the main 32 after the tapping machine is removed. The pipe P is connected to the main by inserting the sleeve nut or second coupling member 42 thereon and then threading the second coupling member onto the first coupling member, If it is desired to use the time lag for disk 38 to dissolve, for further servicing of the pipe P downstream of the coupling of the present invention, the coupling member 22 is drawn up tight from the position shown in FIG. 1 to a position where the nose 16 engages the inner surface of the flared end 44 of pipe P. The service personnel can then proceed to connect the pipe P downstream thereof to a water meter or a curb stop or the like. Once the water soluble disk 38 has dissolved, water will be delivered from the main 32 to the pipe P.

Referring now to FIG. 2 and assuming that the pipe P has already been connected downstream to a water meter, curb stop or the like, immediate service can be made with the main 32 by merely inserting the cutter member 42 between the coupling members and then tightening the second coupling member 22 onto the first coupling member, so that the cutter member 42 advances axially and cuts or breaks at least a portion of the coupon C from the disk 38. The coupon C, when separated from the disk, allows water to immediately flow into the pipe P from the main 32, the coupon blowing downstream in the pipe P by the flow of water. Of course, after a predetermined time the coupon C will dissolve, thus eliminating the possibilities of malfunctions in stops or water meters downstream of the coupling.

Referring now to FIGS. 5 and 6, there is disclosed a modification of the coupling arrangement of the present invention for use with a flareless pipe P', the pipe P' being either a plastic, copper, or steel pipe. In more detail, the coupling arrangement includes a male coupling member 10' having an axial bore 14' therethrough, the axial bore 14' being provided with a first counterbore 15 and a second counterbore 17. An annular shoulder 19 separates the axial bore 14' and the first counterbore 15, whereas a slight annular shoulder 21 separates the first and second counterbores 15 and 17 and provides an interference fit for the cutter member 42' as will be explained in more detail later in the specification. The end portion of the coupling member 10' is provided with a frustoconical end wall 23, as well as the exterior threads 18'. An annular groove 25 is provided in the second counterbore 17, the groove 25 receiving an O-ring seal 27 which is adapted to seal against the wall of the cutter member 42'. Axial bore 14' is provided with an annular groove 36' closely adjacent the shoulder 19, the groove 36' being provided with a water soluble disk 38' similar to that previously described.

The coupling member 22' is a female coupling member having interior threads 20' adapted to cooperate with the threads 18' and an inturned annular frustoconical shoulder 54'. The shoulder 54' terminates in the bore 50', the bore having a diameter at least as great as the exterior diameter of the pipe P'.

Cutter member 42' is provided on its end portion 63 with a pair of oppositely disposed arcuate cutting portions 62' and similar to those previously described for at least cracking and opening in the disk 38'. However, the cutter member 42' is provided with an elongated enlarged cylindrical portion 65 having a diameter slightly greater than the diameter of the first bore 15 but no greater than the diameter of the second bore 17, as the same must slide in the second bore 17, The enlarged cylindrical portion 65 is connected by a shoulder 67 to the end portion 63. An outwardly flared end 70 is provided on the outer end of the cylindrical portion 65, and it will be noted at this time by reference to FIG. 5 that the axial length of the cylindrical portion 65 is greater than the axial length of the second bore 17, so that the flared end 70 is spaced from the frustoconical end 23 of the male member 10'. The interior diameter of the cylindrical portion 65 is sufficient to receive the end portion of the pipe P' with the terminal edge of the pipe abutting the shoulder 67.

An annular compression chamber 69 of variable volume surrounds the pipe P' when the coupling is assembled and an annular gasket seal 71 is positioned in this chamber. The annular gasket seal 71 is made of a noncompressible but deformable elastic material, such as rubber or rubber substitutes.

The annular gasket seal 71 at its forward end is provided with extrusion prevention means 73, such as a coil spring, a bead chain, or the like, molded into the gasket seal, the means 73 preventing extrusion of the gasket when a load is supplied to the same. Additionally, the annular gasket seal is provided on its interior bore with an annular groove 75 which is arranged to receive an axially split metallic ferrule 77 of complementary shape, the ferrule being preferably made of spring steel and adapted to contract when a load is applied to the gasket seal 71, so that the ferrule positively grips the pipe.

If the pipe P' is plastic, a tubular sleeve member 79 made of a rigid material, preferably steel, is inserted into the end portion of the same prior to makeup of the coupling. The purpose of sleeve member 79 is to prevent the pipe P' collapsing when the joint is finally made up and the ferrule 77 is gripping the same.

When the coupling of FIGS. 5 and 6 is initially made up, and the female coupling member 22' is threaded onto the male coupling member 10', the cutter member 42' will be pushed to the position shown in FIG. 5, where its shoulder 67 engages the slight interference shoulder 21 between the first counterbore 15 and the second counterbore 17. When it has reached this position, further tightening of the female member 22' to a predetermined amount will cause a preload to develop within the annular gasket seal 71, and this will cause the same to tightly seal against the exterior of the pipe P' without advancement of the cutter member 42. Consequently, the service personnel can complete the service line downstream of the coupling and test the same as the water soluble disk 38' provides a temporary blockage of water from the water distribution system. Even if the disk dissolves, there will be no leakage at the coupling, due to the preload on the gasket seal 71. After the service line downstream of the coupling has been completed and tested and it is desired to have immediate service, then a load greater than the preload on the gasket seal 71 is applied by further threading of the coupling member 22' onto the coupling member 10' and this increased load will cause the cutter member 42' to move axially toward the disk 38' as the axial pressure on the cutter member will be sufficient to cause the interference shoulder 21 to deform the cutter member, as indicated at 81 in FIG. 6. The female coupling 22' can then be bottomed against the male coupling 10' to fully complete the joint. It will be noted that in the arrangement shown in FIGS. 5 and 6, as compared to the arrangement which is shown in FIGS. 1 and 2, the pipe P' does not move axially in the coupling when the coupling members are threaded together to cause the cutter member 42' to move axially. As the cutter member 42' moves axially, it will eventually have its flared end 70 engage the frustoconical end 23 of the male member 10' and this limits further axial movement of the cutter member. Further threading will merely reduce the volume of the compression chamber 69, putting more load on the gasket seal 71, Since the gasket seal 71 is noncompressible, the deformation of the gasket seal causes the ferrule 77 to contract and thus tightly grip the pipe P' so as to provide the coupling with high pullout strength.

The present invention, as shown in the coupling arrangements of FIGS. 2 and 5, may be utilized in a situation where it is desirable to install the coupling arrangement in a water distribution system under pressure, but service to the service line or pipe is not desired for some undeterminable time. In such a situation, the temporary sealing disk 38 or 38' cannot be made of a water soluble material that is in contact with the water in the water distribution system. Referring now to FIG. 7, there is disclosed a disk 38'', which is used in place of the disk 38 or 38', the disk 38'' being a water soluble disk having a nonsoluble coating "C" thereon at least on the side of the same facing the water in the water distribution system. Preferably both sides of the disk 38'' are coated with a nonsoluble material, as this would permit back testing of the service line downstream of the coupling. Since the coating "C" on the disk 38'' is nonsoluble, the coupling could be installed in the fluid distribution system with the coupling members assembled to a position where the cutter member has not moved axially into engagement with the disk. The coupling could remain in this sealed position for any desirable length of time and then service could be easily activated by merely completing the makeup of the coupling so that the cutter moves axially to engage and cut or break out the disk 38''.

The coating "C" for the disk 38'' could be nonsoluble wax of a thin nonsoluble plastic, or the like, which would crumble when engaged by the cutter member. The soluble material of the disk 38'' would dissolve in the water, whereas the crumbled coating "C" could be flushed down the pipe and discharged therefrom prior to connecting to a house or building.

In FIG. 8 there is a further modified form of disk 38''' made entirely of a nonsoluble material, such as a plastic, resin, ceramic, or the like. The nonsoluble material for the disk 38''' must be of a brittle frangible substance so that when the cutter is actuated, the arcuate projections of the same will break out portions of the disk with the remainder being broken out by the intermediate portions between the arcuate projections. By making the nonsoluble disk 38''' of a brittle frangible material, it can be completely broken out of the coupling member into small enough pieces which can be flushed out downstream of the coupling and thus, the coupling can still have unobstructed flow therethrough, just as in the cases where a soluble disk or a soluble disk with a nonsoluble coating is used.

Having described and illustrated the coupling arrangement, the spirit and scope of the invention is defined in the appended claims.

What I claim is:

1. A pipe coupling for use in connecting an end of a pipe into a water distribution system already under pressure comprising: a first coupling member connected to the water distribution system and a second coupling member receiving the end of said pipe and having preliminary threaded engagement with the first coupling member to provided a preliminary seal with the pipe, each of said first and second coupling members having wall means defining an axial bore therein aligned with each other when the coupling members are in threaded engagement; a disk carried by said first coupling member and extending at least to said wall means defining said bore and temporarily blocking flow through said coupling; a single tubular cutter member positioned within said first and second coupling members and having an exterior surface on one end portion slidably engaging said wall means of the axial bore of said first coupling member; means to cause said cutter member to move axially toward said first coupling member with its one end portion sliding into the bore of said first coupling member and engaging and causing removal of said disk from said wall means of said first coupling member whereby unobstructed flow is provided through said coupling when said first and second coupling members are further threaded into each other to provide a final seal with the pipe, said engagement of said cutter member with said disk occurring only at the area of engagement of said disk with said interior wall means of said first coupling member.

2. A pipe coupling as claimed in claim 1 in which said disk is a water soluble disk.

3. a pipe coupling as claimed in claim 2 in which said water soluble disk is provided with a nonsoluble coating at least on its side facing the water distribution system.

4. A pipe coupling as claimed in claim 3 in which said nonsoluble coating is wax.

5. A pipe coupling as claimed in claim 3 in which said nonsoluble coating is plastic.

6. A pipe coupling as claimed in claim 2 in which said water soluble disk is a carboxy vinyl polymer resin having high molecular weight.

7. A pipe coupling a claimed in claim 2 in which said water soluble disk is a polyethylene oxide resin.

8. A pipe coupling as claimed in claim 2 in which said water soluble disk is a gelatin.

9. A pipe coupling as claimed in claim 1 in which said disk is made of a nonsoluble material.

10. A pipe coupling as claimed in claim 9 in which said nonsoluble disk is made of a brittle frangible material.

11. A pipe coupling as claimed in claim 1 in which said tubular cutter member is provided with oppositely disposed arcuate projections on its one end for engaging said disk when said cutter member is advanced, and means limiting the axial movement of said cutter member to a position at least slightly beyond said disk wherein said arcuate projections and portions of the said one end of said cutter therebetween pass slightly beyond said disk.

12. A pipe coupling for use in connecting an end of a pipe into a water distribution system already under pressure comprising: a first coupling member connected to the water distribution system and a second coupling member receiving the end of said pipe and having preliminary threaded engagement with the first coupling member to provide a preliminary seal with the pipe, each of said first and second coupling members having an axial bore therein aligned with each other when the coupling members are in threaded engagement; a water soluble disk carried by said first coupling member and temporarily blocking flow through said coupling; a tubular cutter member positioned within said first and second coupling members and having an exterior diameter on one end portion no greater than the interior diameter of the axial bore of said first coupling member, said cutter member being provided with oppositely disposed arcuate projections on the said one end portion of the same; means to cause said cutter member to move axially toward said first coupling member with its end portion sliding into the bore of said first coupling member and said arcuate projections engaging and cracking out at least a part from said water soluble disk when said first and second coupling members are further threaded into each other to provide a final seal with the pipe and means limiting the said axial movement of said cutter member to a position at least slightly beyond said disk.

13. A pipe coupling as claimed in claim 12 in which the axial bore in said first coupling member has an annular groove for receiving said water soluble disk.

14. A pipe coupling as claimed in claim 12 in which the axial bore in said first coupling member has an annular groove for receiving said water soluble disk.

14. A pipe coupling as claimed in claim 13 in which said water soluble disk is molded into the groove in the axial bore of said first coupling member.

15. A pipe coupling as claimed in claim 14 in which said water soluble disk is a carboxy vinyl polymer resin having a high molecular weight.

16. A pipe coupling as claimed in claim 14 in which said water soluble disk is a polyethylene oxide resin.

17. A pipe coupling as claimed in claim 14 in which said water soluble disk is a gelatin.

18. A pipe coupling as claimed in claim 12 in which said first coupling member is a male member having a nose portion, and in which said second coupling member is a female coupling member having an interior annular shoulder for receiving a flared end of the pipe, the nose portion of said male coupling member extending into the flared end of the pipe and clamping the pipe in sealing engagement against the interior shoulder in said female coupling member; and in which said means to cause said cutter member to move axially includes an outwardly flared end on said cutter member engaging the interior of the flared end of said pipe so that when said male and female coupling members are threaded into engagement with each other, the cutter member is axially advanced.

19. A pipe coupling as claimed in claim 12 in which said first coupling member is a male coupling member and said second coupling member is a female coupling member having an interior annular shoulder, said female coupling member being threadedly received on said first coupling member and defining therewith an annular compression chamber surrounding the pipe, said male coupling member outwardly of said water soluble disk having a first counterbore separated from the axial bore therein by an annular shoulder and a second counterbore separated from the first counterbore by a second slight annular shoulder, and in which said tubular cutter member is provided with an enlarged cylindrical portion connected by a shoulder to and extending from the said one end portion, said enlarged cylindrical portion having a diameter greater than the diameter of said first counterbore but no greater than the diameter of said second counterbore, said cutter member further having an outwardly flared end on the enlarged cylindrical portion initially spaced from the end of said male coupling within said compression chamber; a noncompressible annular gasket seal made of deformable elastic material positioned in the compression chamber and engaging the flange end of said cutter member and the interior shoulder of said female coupling member, said slight shoulder of said cutter member engaging the annular shoulder between said first and second counterbores so that when said female coupling member is threaded on said male coupling member a predetermined amount, the flange end of said cutter member provides a preload on said gasket seal sufficient to provide a seal with the pipe, said slight shoulder between said first and second counterbores deforming the cylindrical portion of said cutter member when the preload on said gasket is exceeded by further threading of said male and female couplings toward one another, thereby permitting axial advancement of the cutter member toward and through said water soluble disk.

20. A pipe coupling as claimed in claim 19 in which said flange end of said cutter member limits axial movement of said cutter member to a position where the said one end of said cutter member is only slightly beyond said disk.

21. A pipe coupling as claimed in claim 19 in which said second counterbore is provided with an annular groove having a sealing ring therein which seals with the exterior surface of the cylindrical portion of said cutter member.

22. A pipe coupling for use in connecting an end of a pipe into a water distribution system already under pressure comprising: a first coupling member connected to the water distribution system and a second coupling member receiving the end of said pipe and having preliminary threaded engagement with the first coupling member to provide a preliminary seal with the pipe, each of said first and second coupling members having wall means defining an axial bore therein aligned with each other when the coupling members are in threaded engagement; a water soluble disk carried by said first coupling member and extending at least to said wall means defining said bore and temporarily blocking flow through said coupling; a tubular cutter member positioned within said first and second coupling members and having an exterior surface on one end portion slidably engaging the interior wall of the axial bore of said first coupling member; means to cause said cutter member to move axially toward said first coupling member with its end portion sliding into the bore of said first coupling member and engaging and cracking out at least a part from said water soluble disk when said first and second coupling members are further threaded into each other to provide a final seal with the pipe, said engagement of said cutter member with said disk occurring only at the area of engagement of said disk with said interior wall.

23. A pipe coupling as claimed in claim 22 in which said tubular cutter member is provided with oppositely disposed arcuate projections for engaging and cracking an opening in said disk.

24. A pipe coupling as claimed in claim 22 in which said cutter member is further provided with means limiting the said axial movement to a position where the said end portion is only slightly beyond said disk.

25. A pipe coupling for use in connecting a flared end pipe into a water distribution system comprising; a male coupling member and a female coupling member having threaded engagement with each other, each of said male and female coupling members having an axial bore therein aligned with each other when said coupling members are in threaded engagement, said female coupling member having an interior shoulder receiving the flared end of the pipe and said male coupling member having a nose portion engaging the flared end of the pipe clamping the pipe in sealing engagement against the interior shoulder in said female coupling member; a water soluble disk carried by said male coupling member in its axial bore at a distance from its nose portion, temporarily blocking flow through said coupling; and a tubular cutter member positioned between said male and female coupling members and having an exterior diameter on one end portion no greater than the interior diameter of the axial bore of said male coupling member whereby the same will slide into the bore and engage and crack out at least a part from said water soluble disk, said cutter member having an outwardly flared end engaging the interior of the flared end of said pipe whereby said cutter member is moved axially toward the water soluble disk when said male and female coupling members are threaded into engagement with each other, said cutter member being provided with oppositely disposed arcuate projections for engaging and cracking an opening in said disk, and said cutter member being provided with means limiting the said axial movement to a position at least only slightly beyond said disk.